Dec. 10, 1935.  L. L. KAESS  2,023,891
RADIO DIRECTION FINDER
Filed March 10, 1931   2 Sheets-Sheet 1

Louis L. Kaess
INVENTOR

BY Dorsey Hole

ATTORNEYS

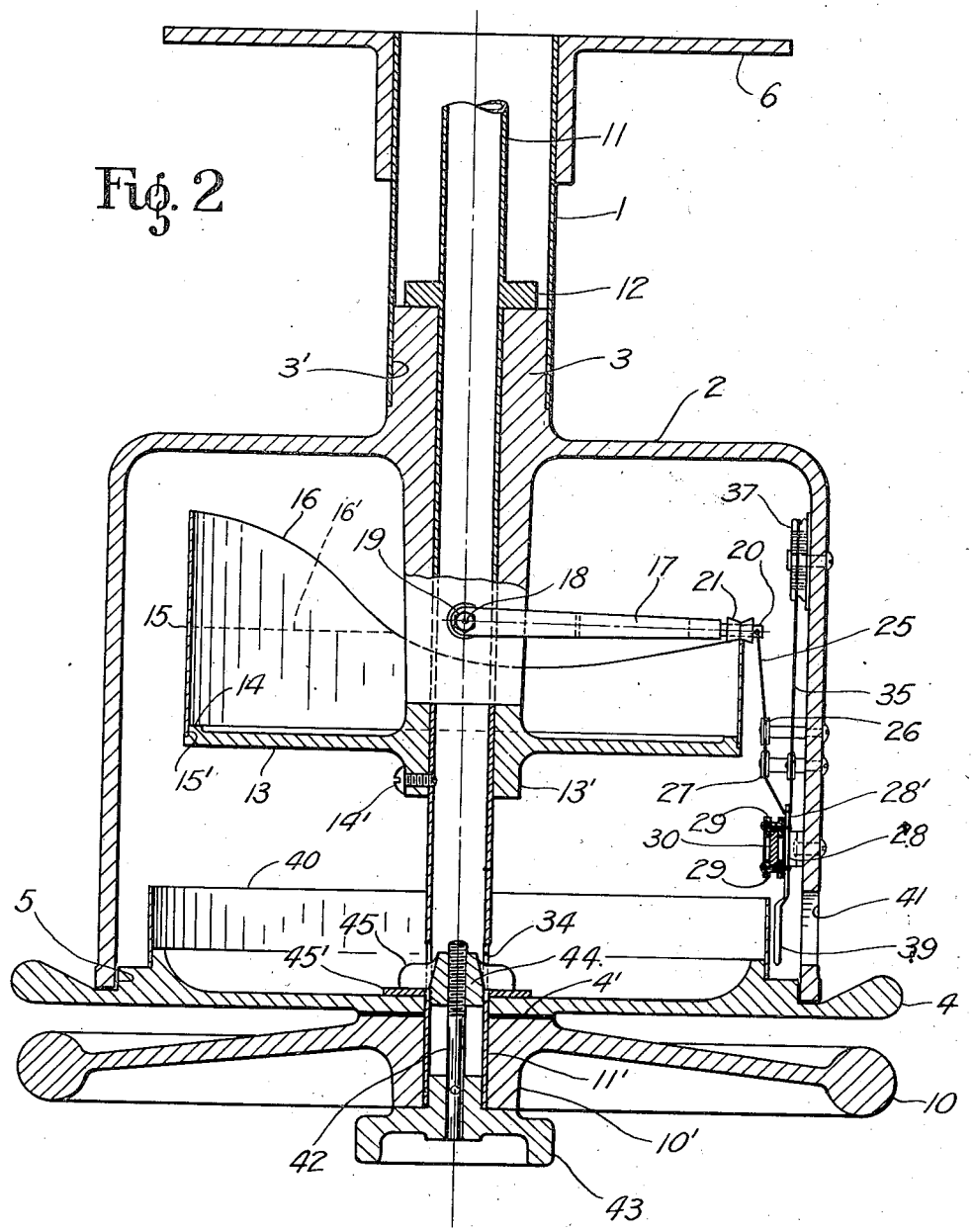

Patented Dec. 10, 1935

2,023,891

UNITED STATES PATENT OFFICE 2,023,891

RADIO DIRECTION FINDER

Louis L. Kaess, Jamaica, N. Y.

Application March 10, 1931, Serial No. 521,564

4 Claims. (Cl. 250—11)

My invention relates to radio direction finders, and more particularly to direction finders suitable for crafts, as ships, airplanes, etc.

One object of my invention is to provide a direction finder which is rugged and simple in construction, and easy to operate.

Another object of my invention is to provide a direction finder which is suitable to be used on a traveling craft and is adapted to receive signals from any type of transmitting station.

A further object of my invention is to provide a direction finder with which bearings can be obtained without the aid of the compass of the craft.

A further object of my invention is to provide means to indicate, for any angular direction, the extent of local electromagnetic influences on the craft, as caused by the iron masses of the craft and other local influences.

A further object of my invention is to provide means for the automatic correction of the errors caused by such local influences.

A further object of my invention is to make observations possible regardless of the direction of the craft or its relative position to the transmitting station from which the signals are received.

A further object of my invention is to obtain direct readings on the device with respect to either of the fore and aft center line of the craft, or the magnetic North Pole or the geographic North Pole.

Further objects will appear as the specification progresses.

In the accompanying drawings, which form part of this specification, Figure 1 is a front elevation of a radio direction finder embodying my invention.

Fig. 2 is a vertical section of the direction finder of Fig. 1, taken along lines 2—2 of Fig. 1.

Figure 3:
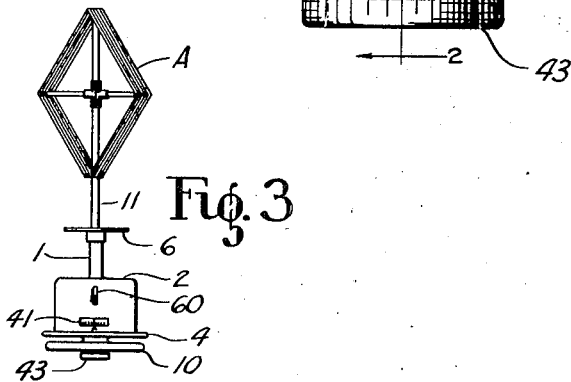
Fig. 3 is a perspective view of the direction finder, also showing the loop antenna.

Referring to the drawings, the apparatus embodies a hollow rod or shaft 11, adapted to carry or be connected with a rotatable antenna A (see Fig. 3). The antenna is preferably a loop-antenna, or a combination of loop antennae of suitable design adapted to receive radio signals which are then transmitted to a suitable receiving set connected with the antenna and are made audible and/or visible by suitable indicating means. While various indicators may be used, I prefer to use a visual indicator as described in my copending application Ser. No. 375,478, of July 2, 1929, Patent No. 1,898,488, issued February 21, 1933.

The general operation of direction finders, as is well known, consists in picking up a signal of a transmitting station and rotating the antenna until either a maximum or a minimum signal strength is indicated. The minimum signal corresponds with a position of the antenna in which its plane is perpendicular to the direction of the transmitting station, and the maximum signal corresponds with a position of the antenna in which the plane of the antenna falls in the direction of the transmitting station.

A cylindrical casting 2 is open at the bottom, and provided with a central substantially cylindrical portion 3 extending from the top of the casing both upwardly and downwardly and constituting a bearing for the hollow shaft 11, the shaft 11 being provided with a ring 12, which loosely rests on top of the cylinder 3, thereby supporting the shaft 11 and permitting its rotation relative to the casing 2.

On its upper portion the cylinder 3 is provided with a peripheral recess 3′ to receive a sleeve 1 fixedly secured to the cylinder 3. The sleeve 1 is connected by means of a flange 6, or other suitable means, to a fixed portion of the craft; for instance, to the roof of a boat's cabin, from which the casing 2 is thus supported.

A circular plate 4 is rotatably inserted at the bottom of the casing 2, being preferably provided with a circular recessed shoulder 5 which extends into the casing. Clearance is provided, but the parts are so proportioned as practically to prevent dust or dirt from entering the casing.

A hand wheel 10 is disposed beneath the plate 4, being provided with a hub 10′ having a cylindrical aperture 11′ to receive the end of the shaft 11, whereby the hub 10′ is fixedly secured to the shaft. The plate 4 is secured to the wheel 10 and the shaft 11 by the following means:

Projecting into the lower end of the tubular shaft 11 is a bolt 42, threaded on its upper end, and provided with a winged nut 44. The wings 45 of the nut project through corresponding holes 34 of the shaft, and overlie a washer 45′ surrounding the shaft on the upper surface of the plate 4. Attached to the lower end of the bolt 42 is a handle 43 which projects with a portion of reduced diameter into the rod 11. The upper face of the hub 10′ contacts with a central embossing 4′ of the plate 4.

The means just described provide for the engagement or disengagement of the wheel 10 and plate 4 in the following way: With the handle 43 in the position shown in Fig. 2, the wheel 10 presses against the plate 4 and engages the latter by friction. If the handle 43 is turned in one direction—in the drawings shown counter-clockwise—the bolt 42 will partly unscrew from the nut 44, and release the pressure exerted by wing nut 45 and washer 45' on plate 4. The latter is now free for manual rotation and can be brought into any angular position relative to the wheel 10, and thus relative to the antenna secured thereto.

A disc 13 is fixedly mounted on the antenna shaft 11 by means of a hub 13' and a fastening screw 14'. The disc 13 has suitably mounted, at its periphery, a cylindrical card 15, having a sinuous upper edge constituting a cam 16.

The cam 16 and the means co-operating therewith, hereafter to be explained, are provided to take care of electromagnetic influences present on the craft, which cause the direction indicated by the position of the antenna to deviate from the correct direction of a transmitting station, the direction of which is to be determined. Such influences are mainly due to iron masses on the craft. The angular deviations between the true direction of the transmitter and the apparent direction indicated by the position of the antenna, can be determined for the craft once for all by taking observations from a transmitter of known direction and turning the ship around a complete circle, thus determining for every angular position of the antenna the deviation between the true and apparent direction.

These deviations, according to my invention, are plotted on the card 15, whereby the length of the graph corresponds to the circumference of the disc 13 and the ordinates which represent the angular deviations—which may be clockwise or counter-clockwise, and are correspondingly plotted above or below a selected zero line 16'—in a scale of proper relation to the parts with which the graph is to co-operate. The resultant curve is of a sinuous character and when the card 15 is cut out along this curve and secured to the graph-holder 13 in the form of a cylinder, its upper edge constitutes the cam 16 for a roller 21 riding on same.

It should be well understood that the graph 15 is so affixed to the graph-holder 13 that for any selected angular position of the antenna, the roller 21 rides on that portion of the cam the height of which corresponds to the deviation caused by the local influences for the selected angular position of the antenna.

Figure 1:
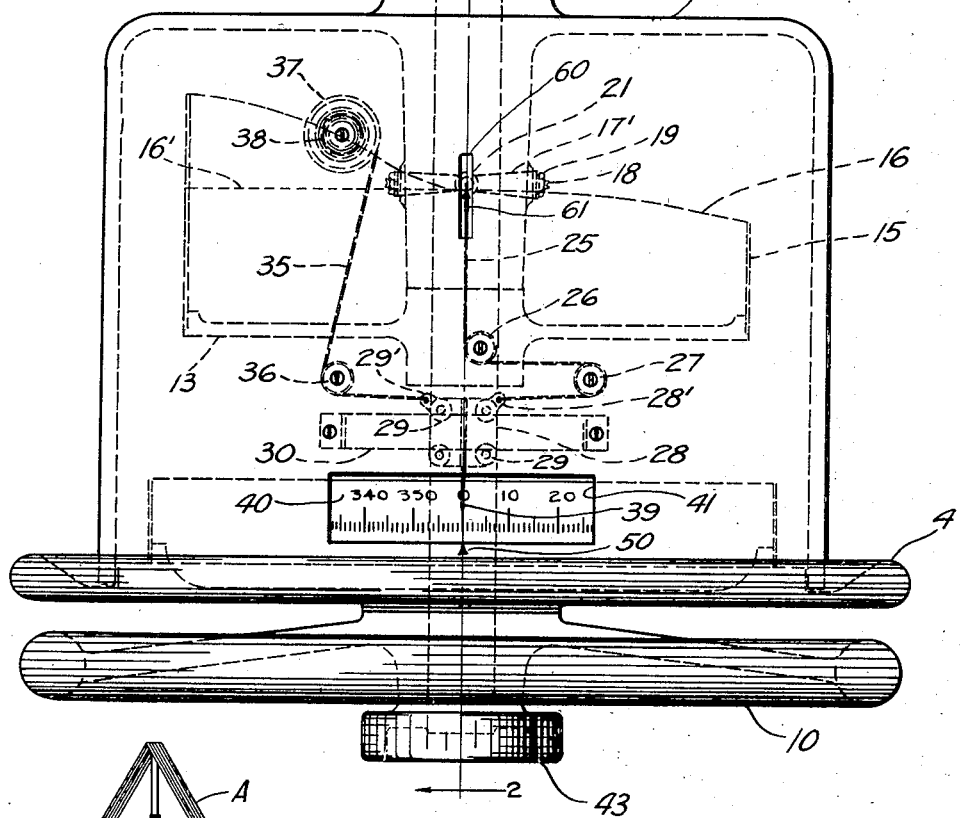

In case I use minimum signal strength observations for direction finding, which I prefer to employ, the zero line 16' is so selected that its height corresponds with the correction required when the antenna plane is perpendicular to the fore and after center line of the craft. In Figs. 1 and 2, such a position of the antenna is shown. A narrow vertical slot 60 is provided on the casing 2, while the graph 15 is provided with an index 61, whereby the index 61 opposes the aperture 60 when the roller 21 comes to ride on that portion of the cam 16 which corresponds to the fore and aft line of the craft.

The roller 21, which rides on cam 16, is loosely mounted on a pin 20 of a lever 17. The lever 17 is fulcrumed by means of a two-arm yoke 17' near the lower end of the cylindrical portion 3 of casing 2 by means of pins 18 and nuts 19.

To the outer end of the pin 20 is secured a cord 25, which passes around two pulleys 26 and 27 mounted on the inner wall of the casing 2, the cord being attached, with its other end, to an ear 28' projecting from an upper corner of a plate 28. The plate 28 is provided, on its upper and lower edges, with inward projecting roller 29—29 riding on the upper and lower edges of a rail 30 located behind the plate 28 and affixed to the inner wall of the casing 2. The plate 28, as will be hereafter explained, is adapted to be shifted along the rail 30. On the other upper corner the plate 28 is provided with an ear 29', to which is attached one end of a cord 35 passing around a pulley 36 mounted on the inner wall of the casing 2, and thence around a drum 37 which is mounted on the inner wall of the casing 2, and has within it a convolute spring 38.

The plate 28 is provided, on its front side, with a downward extending pointer 39, which co-operates with a cylindrical scale 40 carried by the ring plate 4, and calibrated in degrees.

Opposite the plate 28 a window 41 is provided in the wall of the casing 2, which permits a portion of the scale 40 to be observed by the operator. Below the center of window 41 the casing carries an index mark 50 indicating the plumb line of the craft or any fixed direction relative thereto.

As the antenna is rotated the pointer 39 moves along scale 40 relative to index 50, and for any given position of the antenna will be shifted relative to the index 50 by an amount which corresponds in degrees of the scale 40 with the deviation caused by the local influences for this position of the antenna.

With the antenna assuming a position perpendicular to the fore and after center line (for observation of minimum signal strength), as shown in Fig. 1, the roller 21 engages a point of the cam 16 which falls on the zero line 16' of the graph. The index 61 appears, through window 60, and in this position the pointer 39 points to the plumb line index 50. If the antenna is rotated into a position for which the local influences cause a counterclockwise deviation from the true direction, the cam 16 will engage the roller 21 with a correspondingly higher portion. The roller 21, being lifted, exerts a pull on the cord 25, and causes the latter to move the plate 28 and the pointer 29 towards the right (thus counter-clockwise) relative to index 50, by an amount, which expressed in degrees of the scale 40, is equal to the angular deviation caused in the counterclockwise direction by the local influences.

On the other hand, if the antenna is moved into a position for which the local influences cause a clockwise deviation from the true direction, a cam portion which falls below the zero line 16' engages the roller 21, and the plate 28, under the action of the spring 38, is moved by the cord 35 towards the left, thereby moving the pointer to the left (or clockwise) relative to index 50, by an amount, which expressed in degrees of the scale 40, is equal to the clockwise deviation caused by the local influences.

If a bearing is to be taken with respect to the bow of the craft—that is, with respect to the fore and after center line, the procedure is the following:

The antenna is brought into its zero position, which in case the bearings are taken by determining the minimum signal strength corresponds to the position in which the plane of the antenna is perpendicular to the fore and aft center line of the craft. For this end the antenna is rotated by means of the wheel 10 until the index 61 of the correction graph 15 appears through window 60.

The plate 4 is then unlocked from antenna wheel 10 by unscrewing the knob 43 and the plate 4 rotated until the zero of its scale 40 comes in juxta-position with the index 50. The plate 4 is then again locked to the wheel 10 by means of the knob 43 and the plate rotated with the antenna by means of wheel 10 until minimum signal strength is observed. In this position, the pointer 39 will indicate on scale 40 the correct angle which the direction of the transmitting station encloses with the fore and aft center line of the craft.

It should be noted that the corrections for the deviations caused by local influences are made automatically, due to the shifting of the pointer 39 in regard to the index 50.

In case the bearing is taken in respect to the magnetic North Pole, instead of the fore and aft center line of the craft, the procedure is the following:

The antenna is again brought in its zero position, as previously described. The plate 4 is unlocked from the wheel 10 and the antenna. A reading is taken on the magnetic compass of the craft, determining the angle which the fore and aft center line of the craft encloses with the direction of the magnetic North Pole and the plate 4 is rotated until its scale 40 opposes the index 50 to give a corresponding reading. Plate 4 and wheel 10 are now locked and the antenna rotated together with the plate 4 until minimum signal strength is observed. The reading indicated by the pointer 39 on scale 40 gives the bearing in respect to the magnetic North Pole.

In case the bearing is to be taken in respect to the geographical North Pole, the antenna is again brought in its zero position as above described, and after unlocking the plate 4 from the wheel 10, the plate 4 is rotated until its scale 40 opposes the index 50 with a reading corresponding to the reading on the magnetic compass plus or minus the known compass correction. The plate 4 is now locked to wheel 10 and thus to the antenna, with which it is rotated until minimum signal strength is obtained. The pointer 39 will now indicate on scale 40 the bearing as taken in respect to the geographical North Pole.

From the above, it will be apparent that the local influences of the craft are automatically eliminated for any angular position of the antenna and irrespective whether the observations are made in regard to the fore and aft center line of the craft or the magnetic North Pole or the geographical North Pole or any other fixed direction.

It should also be noted that bearings can be taken without the aid of the compass of the craft and, therefore, the readings so obtained are independent of the known or unknown errors of the compass. Therefore, my direction finder can be used for the correction of the errors of the compass.

While I have illustrated my invention in a specific application and described a specific construction thereof, I do not wish to be limited to such application and construction, but desire the appended claims to be construed as broad and permissible in view of the prior art.

What I now claim and desire to secure by Letters Patent is:

1. In combination with a directional antenna on a craft subject to quadrantal errors, a shaft rotatable with said antenna; a scale; a pointer providing a normal position of reference for said scale, said scale being rotatable with said shaft; said scale being adjusted to indicate substantially the angular position of said shaft with reference to the keel line of the craft; quadrantal error correcting means controlled by said shaft as it rotates to move said pointer variable distances from said normal point of reference to new points of reference in accordance with predetermined corrections for different angular positions of said shaft; and means for adjusting said scale with respect to said shaft whereby said scale reference reading is made with respect to the magnetic compass.

2. In combination with a directional antenna on a craft subject to quadrantal errors, a shaft rotatable with said antenna, a scale rotatable with said shaft, said scale being adjusted to indicate substantially the angular position of said shaft with reference to the keel line of the craft; a pointer providing a normal position of reference for said scale; quadrantal error correcting means controlled by said shaft as it rotates to move said pointer variable distances from said normal point of reference to new points of reference in accordance with predetermined corrections for different angular positions of said shaft; means for rotating said scale with respect to said shaft whereby said scale reference reading is made with respect to the magnetic compass; and a second indicator controlled by said shaft for indicating a predetermined angular position of said loop with respect to the keel line of said craft.

3. Indicating apparatus comprising a rotatable shaft, a pointer, a scale, said pointer having a normal position of reference with respect to said scale, said scale being rotatable with said shaft past said pointer to indicate the true angular position of said shaft when said pointer is in its normal position, a quadrantal error correcting member rotatable with said shaft for displacing said pointer angularly from said normal position in an amount to compensate for the quadrantal error at all angular positions of said shaft and means for rotating said scale with respect to said shaft whereby said scale indicates the bearing from true north or from the ship's bow.

4. In combination with a directional antenna subject to quadrantal errors; a shaft rotatable with said antenna; a scale; a pointer providing a normal position of reference for said scale, the scale being movable relative to the pointer as the shaft rotates for indicating the angular position of said antenna with respect to a predetermined direction; quadrantal error correcting means controlled by said shaft as it rotates to change the normal position of reference of said pointer and scale to a new point of reference in accordance with predetermined quadrantal error corrections for different angular positions of said shaft and means for adjusting said scale with respect to said shaft whereby said scale reference reading is made with respect to a different direction than said predetermined direction.

LOUIS L. KAESS.